United States Patent
Bohn

(10) Patent No.: US 8,745,852 B2
(45) Date of Patent: Jun. 10, 2014

(54) METHOD OF MAKING A SELF-ADHERING RFID ANTENNA

(75) Inventor: Martin Bohn, Reutlingen (DE)

(73) Assignee: bielomatik Leuze GmbH & Co. KG, Neuffen (DE)

( * ) Notice: Subject to any disclaimer, the term of this patent is extended or adjusted under 35 U.S.C. 154(b) by 1219 days.

(21) Appl. No.: 12/602,306

(22) PCT Filed: Jun. 4, 2008

(86) PCT No.: PCT/EP2008/004432
§ 371 (c)(1),
(2), (4) Date: Nov. 30, 2009

(87) PCT Pub. No.: WO2008/148527
PCT Pub. Date: Dec. 11, 2008

(65) Prior Publication Data
US 2010/0177008 A1    Jul. 15, 2010

(30) Foreign Application Priority Data

Jun. 6, 2007 (DE) .......................... 10 2007 026 720

(51) Int. Cl.
*H01P 11/00* (2006.01)
(52) U.S. Cl.
USPC ............. 29/600; 29/602.1; 29/825; 29/592.1; 235/488; 340/572.1

(58) Field of Classification Search
USPC ........................ 29/600–601, 592.1, 830–832; 343/700 MS, 786; 340/572.1, 572.7; 235/488; 156/324, 250
See application file for complete search history.

(56) References Cited

U.S. PATENT DOCUMENTS

| | | | | |
|---|---|---|---|---|
| 4,846,922 A * | 7/1989 | Benge et al. | .................. | 156/324 |
| 4,900,386 A * | 2/1990 | Richter-Jorgensen | ........ | 156/250 |
| 6,161,276 A | 12/2000 | Droz | ............................ | 29/602.1 |
| 7,233,296 B2 * | 6/2007 | Song et al. | ..................... | 343/713 |
| 7,650,683 B2 * | 1/2010 | Forster et al. | ................... | 29/600 |
| 8,171,624 B2 * | 5/2012 | Forster et al. | ................... | 29/832 |
| 8,368,538 B2 * | 2/2013 | Rexer et al. | ................ | 340/572.1 |
| 8,371,509 B2 * | 2/2013 | Bohn | ............................ | 235/488 |
| 2003/0112202 A1 | 6/2003 | Vogt | ............................ | 343/873 |
| 2008/0295318 A1 | 12/2008 | Bohn | ............................ | 29/601 |

* cited by examiner

*Primary Examiner* — Minh Trinh
(74) *Attorney, Agent, or Firm* — Andrew Wilford

(57) ABSTRACT

An RFID antenna assembly is made by first adhering a continuous aluminum foil between 1 μm and 20 μm thick by an adhesive film to a front face of a mounting layer, then providing on a back face of the mounting layer a film of contact adhesive, and then releasably securing to the mounting-layer back face a backing strip. The foil and the mounting layer but not the backing strip are then punched through so as to punch out antennas from the foil and identical pieces from the mounting layer. Finally the foil and mounting layer are stripped from around the punched-out antennas on the backing strip to leave on the backing strip a row only of the punched-out antennas and the respective pieces of the mounting layer.

7 Claims, 4 Drawing Sheets

METHOD OF MAKING A SELF-ADHERING RFID ANTENNA

CROSS REFERENCE TO RELATED APPLICATIONS

This application is the US national phase of PCT application PCT/EP2008/004432, filed 4 Jun. 2008, published 11 Dec. 2008 as WO2008/148527, and claiming the priority of German patent application 102007026720.9 itself filed 6 Jun. 2007, whose entire disclosures are herewith incorporated by reference.

FIELD OF THE INVENTION

The invention relates to a self-adhesive antenna for an RFID system, particularly for an RFID label, and a method for the production thereof.

BACKGROUND OF THE INVENTION

It is known that RFID systems comprise a transponder including an RFID chip and an RFID antenna. As is known, RFID labels are produced in such a way that a so-called RFID inlay with a transponder is provided between a cover strip provided on the lower face with a contact adhesive film and a support layer, which is also a strip, which is removable from the contact adhesive film. The RFID inlay comprises an RFID chip mounted on a flat antenna and electrically connected thereto, with the RFID antenna being mounted on an antenna foil.

Various methods are known for manufacturing RFID antennas. According to one method, the antenna contour is etched out of a foil. This method is slow, expensive, and harmful to the environment. As an alternative, the antenna may be applied directly to a correspondingly structured strip material by metalizing. Similarly, it has also already been proposed that the antennas be produced by printing using a conductive ink, for example, silver ink. This method is also expensive and—to the extent that the ink contains a heavy metal—harmful to the environment. PET is usually used as the flat backing strip to which the flat antennas are applied. This material is not recyclable.

OBJECT OF THE INVENTION

The object of the invention is therefore to provide an antenna for an RFID system that may be produced from easily recyclable material at a reduced cost.

SUMMARY OF THE INVENTION

This object is attained in that it is produced from an aluminum foil with a low thickness between 1 µm and 20 µm, preferably approximately 10 µm. Aluminum foils of this thickness are mass-produced, for example, as household foils. Paper that is also easily recyclable is preferably used as the backing strip.

The aluminum foil that has been wound up into a roll may be further processed in a simplified manner in RFID machines for the production of RFID labels using rotating tools. In this manner, an electrically optimized UHF antenna may be produced more simply.

BRIEF DESCRIPTION OF THE DRAWING

The drawings explain the invention with reference to illustrated embodiments that are shown in a simplified manner. In the drawing.

DETAILED DESCRIPTION OF THE INVENTION

Figure 1:
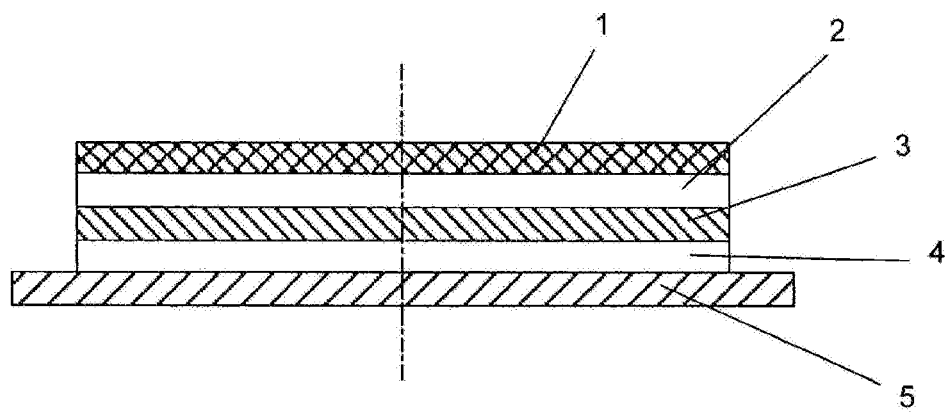
FIG. 1 is a section through a self-adhesive antenna made according to the invention.
Figure 1A:
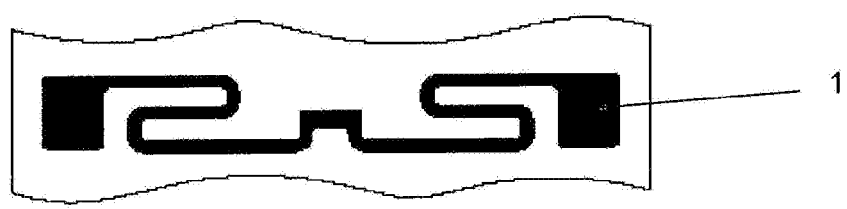
FIG. 1A is a view of a single antenna according to the invention.
Figure 7:
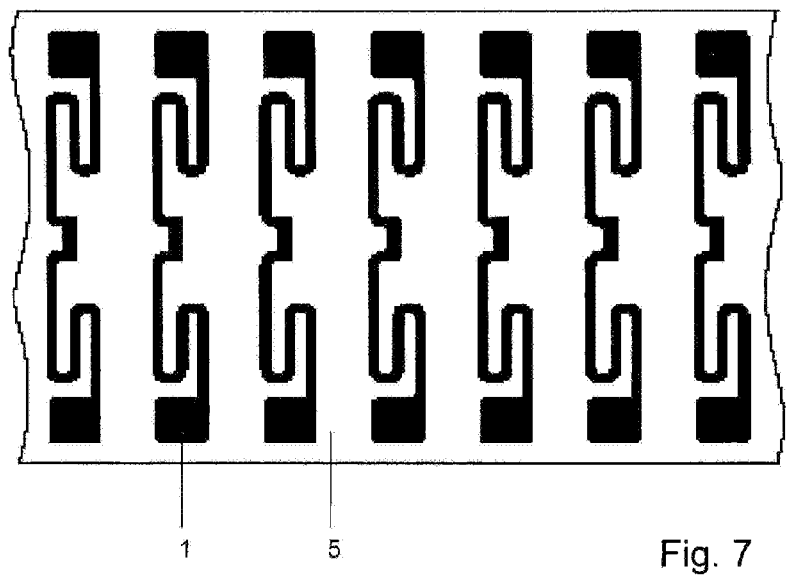
FIG. 7 is a top view of piece of a flat backing strip having a series of antennas that have been attached adhesively.

The antennas, which are shown in a sectional view in FIG. 1 and top views in FIGS. 1A and 7, are provided for use in an RFID system, in particular for an RFID label. As is known, self-adhesive RFID labels comprise an RFID inlay with an RFID chip and an RFID antenna adhered to a sheet or strip. Such an RFID label and a method for making it are disclosed in WO 2005/076206 [US 2008/0295318].

The antenna 1, which is usable as a UHF antenna, is stamped out of a thin aluminum foil having a thickness of 1 µm to 20 µm, particularly approximately 10 µm. The antenna 1 is adhered to the front face of a strip- or sheet-shaped mounting layer 3 preferably made of paper by means of an adhesive film 2. On its back face, the mounting layer 3 is provided with a contact adhesive film 4. The contact adhesive film 4 is covered by a strippable backing sheet or strip 5. Siliconized paper is preferably used as the backing strip 5. The contact adhesive film 4 adheres more strongly to the mounting layer 3 than to the backing strip 5, so that the backing strip 5 can be pulled off and leaves an adhesive film on the back face of the mounting layer 3. By means of this adhesive film 4, an antenna 1 adhering to the mounting layer 3 may be adhesively fixed to a substrate, for example onto an inlay.

Figure 2:
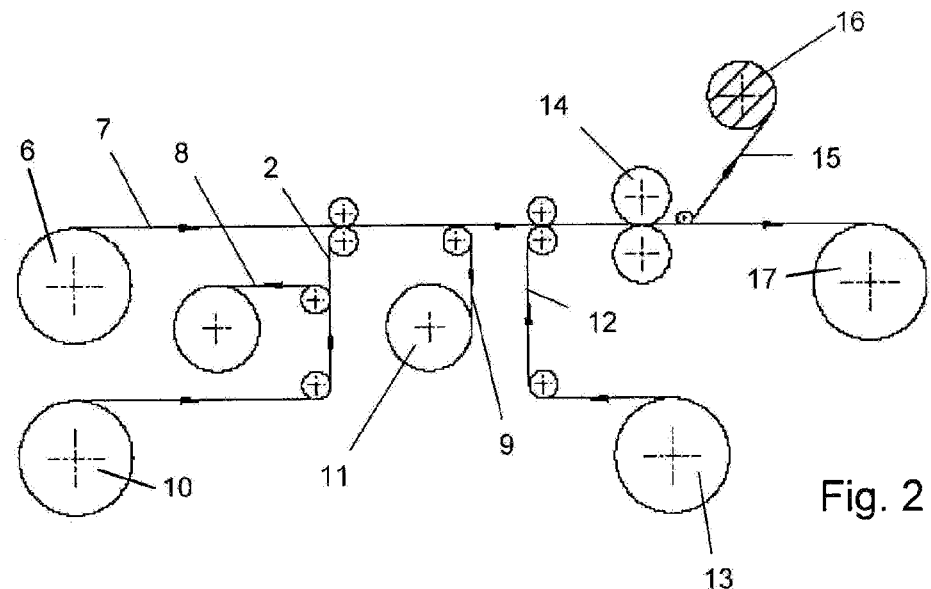
FIG. 2 is a small-scale schematic side view of an apparatus for carrying out the method of this invention.
Figure 3:
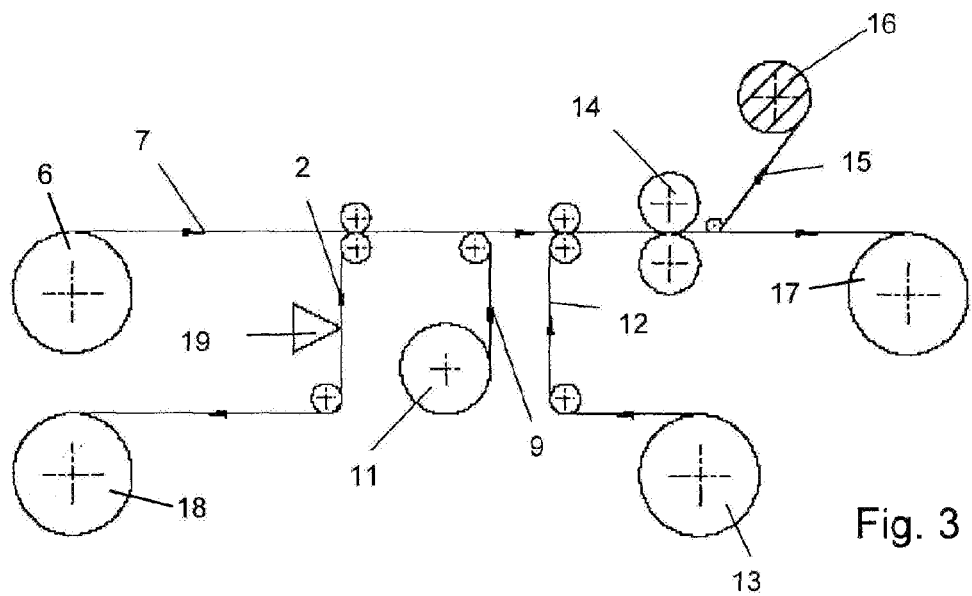
FIGS. 3, 4, 5, and 6 are views like FIG. 2 of further apparatuses for carrying out variants of the method of this invention.
Figure 4:
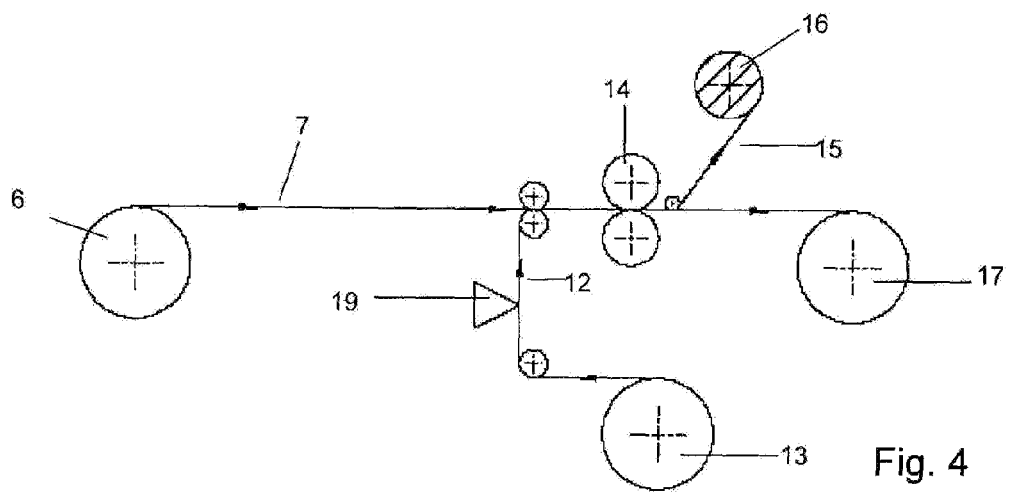

In FIGS. 2 to 4, three methods of making the self-adhesive antennas 1 are shown in which an aluminum foil having a thickness of 10 µm to 20 µm, particularly approximately 10 µm, is unrolled as a strip from a roll 6 and made into antennas. The back face of the aluminum foil 7 pulled off the roll is subsequently provided with the adhesive film 2. In the method of FIG. 2, the application of the adhesive film 2 is done by transfer. For this transfer, the adhesive film 2 is covered on its front face by a cover layer 8 and on its back face by a backing tape 9. The transfer adhesive laminate is pulled off a roll 10, its cover layer 8 is pulled off, and it is pressed against the back face of the aluminum foil 7. Upon contact with the aluminum foil 7 the adhesive film 2 sticks to the back face of foil 7, and subsequently the backing tape 9 is pulled off the transfer adhesive and wound up on a roll 11. This leaves the adhesive layer 2 on the aluminum foil 7. A self-adhesive sheet or strip 12 is then pulled off a roll 13 and adhered to the adhesive film 2. The self-adhesive strip 12 comprises the adhesive layer 4 with the mounting layer 3 on its front face and the backing strip 5 on its back face.

The laminate comprising the backing strip 5, the mounting layer 4, and the aluminum foil 1 sandwiching the adhesive films 2 and 4 is subsequently guided through a rotary die 14. The rotary die 14 punches through the aluminum foil 7 and the mounting layer 3 to form individual antennas 1. The punching scraps 15 comprising the remaining aluminum foil 7 and the remaining mounting layer 3 is subsequently pulled off and wound into a roll 16 as recyclable waste material. The antennas 1 provided on their back faces with the mounting layers 3 that have also been punched into the shape of an antenna, remain on the intact backing strip 5 and are subsequently wound into a roll 17 therewith. The roll 17 thus holds a row of individual antennas 1 shown in FIG. 7 that are each secured to a respective mounting layer 3 and removably adhered to the backing strip 5.

Because the thin aluminum foil 7 is reinforced by the mounting layer 3 adhered to its back face, it is possible to punch out the individual antennas 1 and to remove the punching scraps 5 without tearing the aluminum foil. Thus, it is possible to use an extremely thin and cheap aluminum foil to make the antennas. At the same time, it is possible to use the antenna material in roll form as the starting blank and to use tools operating in a rotating fashion on known machines for processing flat material. As an antenna material, aluminum is compatible with food and drugs and has good electrical conductivity for use as a UHF antenna.

The method shown in FIG. 3 corresponds to the method described above in conjunction with FIG. 1 with the exception that the adhesive film on the back face is bonded to the aluminum foil 7 in a different manner. To this end, a backing tape made of silicon paper is pulled off a roll 18 and first provided on its front face with the adhesive film 2 by means of a hot melt applied by a flat sheet die 19. The adhesive film 2 is then transferred onto the back face of the aluminum foil 7 in the manner described above. The backing tape 9 is then again pulled away from the aluminum foil 7 and wound into the roll 11.

In the method according to FIG. 4, the adhesive film 2 is first applied to the front face of the cover layer of the self-adhesive strip 12 before it is connected to the aluminum foil 7. This application also occurs by means of a flat sheet die 19 as a hot melt application. In this variant, the cover layer of the self-adhesive strip 12 simultaneously serves as the mounting layer 3.

Figure 5:
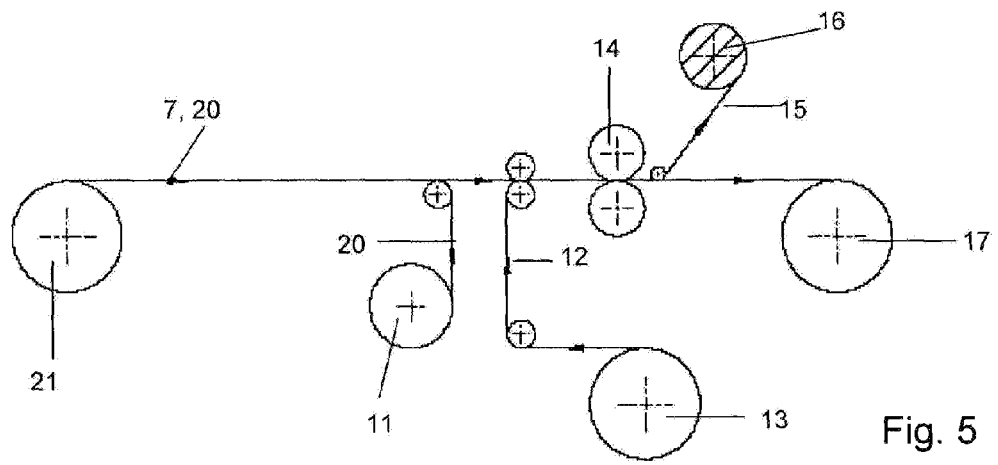

FIG. 5 shows a variant in which a laminate made of aluminum foil 7 and a silicon backing tape 20 is used as the starting blank, with the backing tape 20 being adhered in a removable fashion to the back face of the aluminum foil 7. Upon removal of the backing tape 20, the adhesive film 2 remains on the back face of the aluminum foil. The laminate 7, 20 is pulled off a roll 21; subsequently the backing tape 20 is stripped off and wound into a roll 22. This leaves the aluminum foil 7 with an adhesive film 2 on its back face, which is first bonded to a self-adhesive strip 12 in the manner described in conjunction with the above embodiments before the antennas 1 are punched out.

Figure 6:
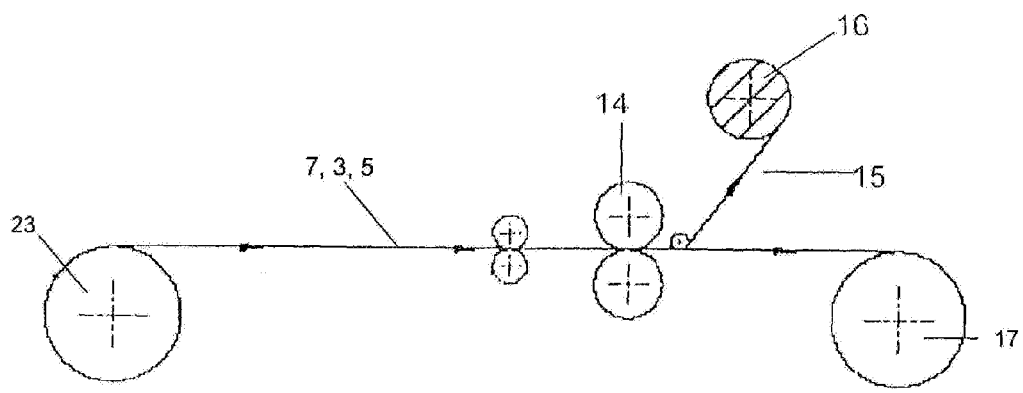

FIG. 6 shows a variant in which a flat laminate comprising an aluminum foil 7, a contact adhesive film 3, and a silicon backing strip 5 is used as a starting blank. The aluminum foil is adhered to the front face of the layer 3 and the backing strip 5 is adhered in a removable manner to the back face of the aluminum foil 7. Upon the removal of the backing strip 5, the adhesive film 2 remains of the back face of the mounting layer 3. The laminate 7, 3, 5 is pulled off a roll 23, and the antennas 1 are subsequently punched out. The punching preferably extends through the layer 3. In this manner, an antenna structure is produced that is reinforced by the mounting layer 3 as well as correspondingly reinforced punching scraps 15. After punching, the remaining punching scraps 15 are removed along with the remaining aluminum foil 7 and, optionally, the remaining mounting layer 3 and wound into a roll 16. The silicon carrier 5 with the antennas 1 that are reinforced by the mounting layer 3 adhered thereto is subsequently wound into a roll 17.

The invention claimed is:

1. A method of making an RFID antenna assembly, the method comprising the steps of:
   adhering a continuous aluminum foil between 1 μm and 20 μm thick by an adhesive film to a front face of a mounting layer;
   providing on a back face of the mounting layer a film of contact adhesive;
   releasably securing to the mounting-layer back face a backing strip;
   punching through the foil and the mounting layer but not through the backing strip so as to punch out antennas from the foil and identical pieces from the mounting layer; and
   stripping the foil and mounting layer from around the punched out antennas on the backing strip and thereby leaving on the backing strip a row only of the punched-out antennas and the respective pieces of the mounting layer.

2. The method defined in claim 1 wherein the backing layer and backing strip are of paper or a flexible plastic.

3. The method defined in claim 1 wherein the foil is adhered to the mounting layer by the steps of:
   providing the adhesive film between a backing tape and a cover strip wound up on a roll;
   unwinding the film with its backing tape and cover strip from the roll;
   thereafter pulling the cover strip off the adhesive film;
   thereafter pressing the adhesive film and backing tape against the back face of the foil with the adhesive film in direct contact with the foil back face;
   thereafter pulling the backing tape off the adhesive film and leaving the adhesive film on the foil back face; and
   thereafter pressing the adhesive film against the front face of the backing strip.

4. The method defined in claim 1 wherein the foil is adhered to the mounting layer by the steps of:
   applying the adhesive film to a front face of a backing tape;
   thereafter pressing the backing tape and the adhesive film against the back face of the foil with the adhesive film in direct contact with the foil back face;
   thereafter pulling the backing tape off the adhesive film and leaving the adhesive film on the foil back face; and
   thereafter pressing the adhesive film against the front face of the backing strip.

5. The method defined in claim 1 wherein the foil is adhered to the mounting layer by the steps of:
   initially adhering the foil by the adhesive layer to a backing tape;
   thereafter stripping the backing tape off the adhesive layer; and
   thereafter pressing the adhesive film against the front face of the backing strip.

6. The method defined in claim 1 wherein the foil is adhered to the mounting layer by the steps of:
   forming the contact-adhesive film, the backing strip, and the mounting strip into a strip laminate with the contact-adhesive film between the backing strip and the mounting strip; and
   pressing the strip against the back face of the laminate.

7. The method defined in claim 1 wherein the punching is done on a rotary die.

* * * * *